United States Patent [19]

Volk

[11] 4,177,652
[45] Dec. 11, 1979

[54] REFRIGERATION SYSTEM

[76] Inventor: Lawrence C. Volk, 10001 Beech St., Fontana, Calif. 92335

[21] Appl. No.: 866,221

[22] Filed: Jan. 3, 1978

Related U.S. Application Data

[63] Continuation-in-part of Ser. No. 717,101, Aug. 24, 1976, abandoned.

[51] Int. Cl.² ............................................. B60H 3/04
[52] U.S. Cl. ...................................... 62/239; 62/422; 62/425; 62/459
[58] Field of Search ................. 62/420, 421, 422, 423, 62/424, 425, 459, 239

[56] References Cited

U.S. PATENT DOCUMENTS

| 2,477,823 | 8/1949 | Reilly | 62/420 |
| 2,557,004 | 6/1951 | Lepper | 62/239 |
| 2,718,124 | 9/1955 | Gilliam | 62/420 |
| 2,802,347 | 8/1957 | Marcus | 62/459 |
| 3,796,063 | 3/1974 | Wulke | 62/457 |

*Primary Examiner*—Ronald C. Capossela
*Attorney, Agent, or Firm*—Harvey S. Hertz

[57] ABSTRACT

A refrigeration system for a catering truck includes a reservoir of ice cubes. A food compartment is provided for storing food under refrigeration and includes a cooling section adjacent thereto. Ice cubes are fed from the reservoir to the cooling section. A blower circulates cool air from the cooling section through the food compartment.

3 Claims, 5 Drawing Figures

REFRIGERATION SYSTEM

This is a continuation-in-part of application Ser. No. 717,101, filed Aug. 24, 1976, now abandoned.

BACKGROUND OF THE INVENTION (1) Field of the Invention

The field of art to which the invention pertains includes the field of catering truck refrigeration systems, particularly with respect to a refrigeration system utilizing a minimum of electrical power.

(2) Description of the Prior Art

Conventional catering trucks provide a mobile field food system in places where no fixed facilities exist. Typically, such trucks have been found extremely useful in the construction industry where the construction employees must be fed and no conventional eating facility exists. The catering trucks also have been found to be useful where large numbers of people must be fed such as at conventions and parades or the like. The popularity of the catering truck has derived from the fact that the truck can provide hot as well as cold food and thus meeting the needs of a wide range of people. Health care standards have been set up to be certain that the refrigerated foods are kept at a certain minimum temperature slightly above freezing to prevent spoilage.

Conventional catering truck refrigeration facilities are normally provided by utilizing a compresser which operates off the catering truck motor. These compressers require that the catering truck motor be operational when the compresser is operating and such a system utilizes large amounts of power. In addition, it has been found that the compresser, which is the heart of the refrigeration system, constantly breaks down and must be repaired or continuously replaced. These compressers are relatively expensive and thus have increased the costs of food supplied by a catering truck. In addition, once the compresser fails, the food in the catering truck spoils if not refrigerated after a short period of time.

The present invention provides a relatively foolproof refrigeration system which eliminates the need for catering truck compressers and does not require that the catering truck motor be operational. A minimum amount of power is consumed when the refrigeration system is in operation. In addition, the entire system is relatively inexpensive and can be easily installed in conventional catering trucks.

Known prior art includes U.S. Pat. Nos. 189,958; 2,988,901; 1,805,809; U.S. Pat. No. Re. 21,849; U.S. Pat. No. 171,591; 190,416; 718,606; 1,952,981; and 1,909,261.

SUMMARY OF THE INVENTION

A refrigeration system for a catering truck for enabling food to be kept at a relatively cool temperature. A food compartment is provided for storing the food under refrigeration. The food compartment includes a cooling section adjacent thereto with ice cubes from a reservoir being fed into the cooling section. A blower is provided for circulating the cool air from the cooling section throughout the food compartment.

The advantages of this invention, both as to its construction and mode of operation, will be readily appreciated as the same becomes better un-erstood by reference to the following detailed description when considered in connection with the accompanying drawings in which like reference numerals designate like parts throughout the Figures.

DESCRIPTION OF THE PREFERRED EMBODIMENTS

Figure 1:
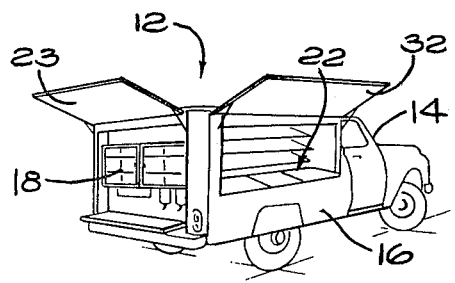
FIG. 1 is a perspective view of a conventional catering truck which can be modified to include the present invention.

Referring now to the drawings, there is shown in FIG. 1 a catering truck 12 having the refrigeration system of the present invention mounted therein. Typically, the catering truck contains a conventional cab 14 and a body 16 mounted on the rear portion of the truck chassis. The catering truck 12 normally contains a hot food section 18 at the rear end thereof and a refrigerated section 22 on one side. Of course, alternative arrangements are also possible as can be readily seen.

Figure 2:
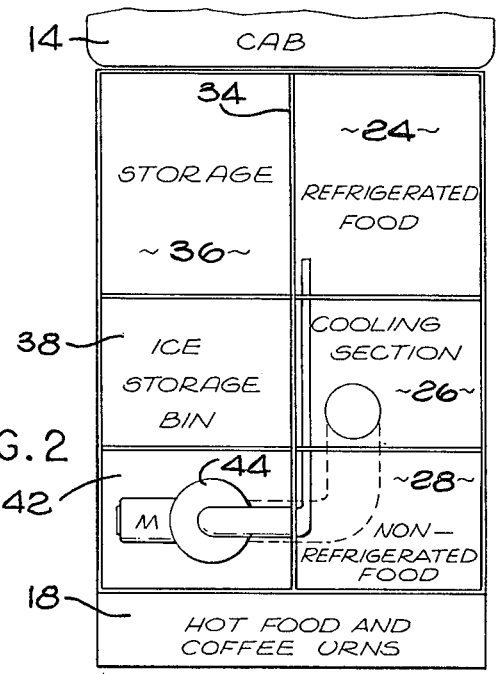
FIG. 2 is a top plan view of a portion of the catering truck of FIG. 1 used to illustrate the food arrangement therein.

Referring not to FIG. 2 there is shown a top plan view of the food layout of a conventional catering truck. As previously mentioned, hot food and coffee urns normally are placed in the rear hot food section with access being obtained via a lift up door 23 (FIG. 1). The refrigerated section 22 includes a refrigerated food compartment 24 on the right truck side adjacent the truck cab 14 and a cooling section 26 directly adjacent and behind the refrigerated food compartment 24. Between the hot food section 18 and the refrigerated compartment cooling section 26 there is normally a non-refrigerated food section 28 where foods such as potato chips and other items which need not be refrigerated or heated are displayed. The right side of the truck normally also has access by means of a lift up door 32 (FIG. 1).

The right side of the truck and the left side of the truck are normally divided by means of a central partition 34 which extends from the cab end directly up to the hot food compartment 18. Behind the refrigerated food section 24 on the left side of the catering truck there is normally a storage section 36 wherein foods for future sale as well as other supplies can be kept. Adjacent the cooling section 26 and directly behind the storage section 36 there is placed an ice storage bin 38 whose function will be described hereinafter and which provides ice to the cooling section 26 as needed. Adjacent the non-refrigerated food section 28 and directly behind the ice storage bin 38 there is additional storage space 42 which also has mounted therein a conventional fan 44 which supplies air to the cooling section 26 and enables the cool air to circulate throughout the refrigerated food compartment 24 as will be explained in greater detail hereinafter.

Figure 3:
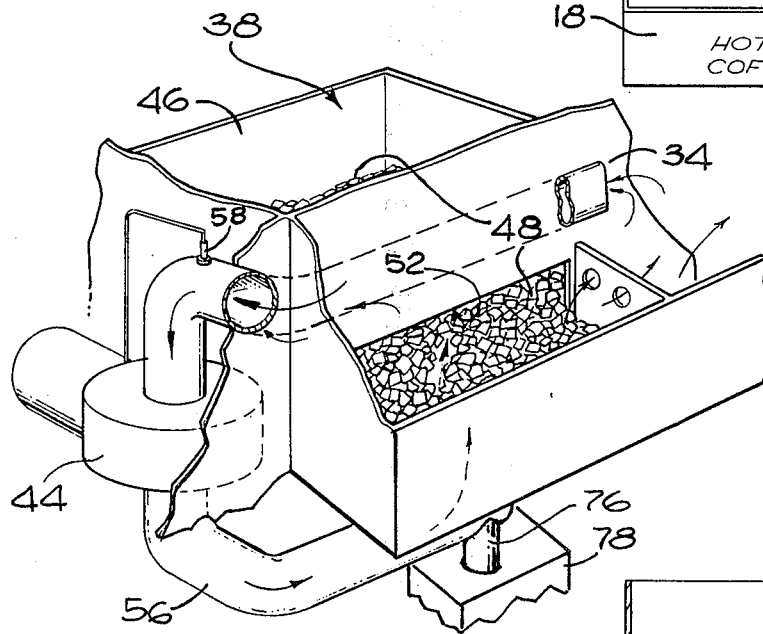
FIG. 3 is a partial perspective view of the refrigeration system used to explain the invention.

FIG. 3 is a schematic illustration of the refrigeration system utilized in the present invention. In FIG. 3 the ice storage bin 38 has a central top opening 46 into which ice cubes 48 are placed. The ice cubes are fed from the ice storage bin 38 into the cooling section 26 through an aperture 52 which is formed at the bottom of the ice storage bin 38 in the divider wall 34.

The fan 44 draws air from the refrigerated food compartment 24 through a exhaust pipe 54, the air then circulates back through an intake pipe 56 to the cooling section 26. The air then circulates through the cooling section 26 and into the refrigerated food section 24 and the cycle is repeated. A temperature sensor 58 is placed in the exhaust air pipe 54 to determine the temperature of the air in the refrigerated food compartment 24. Normally it is desirable to keep the temperature of the air in the food compartment at approximately 40 degrees or below. The temperature sensor 58 senses this temperature and actuates the fan 44 when the temperature in the food compartment 24 rises. Thus, the fan 44, which normally operates off the truck battery, does not have to be continuously operated.

Figure 4:
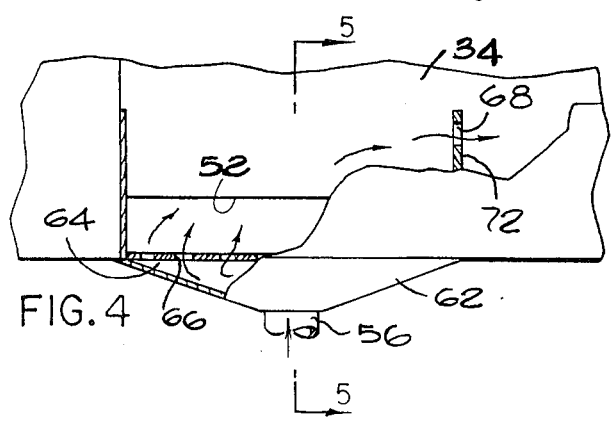
FIG. 4 is a cross-sectional view of the refrigeration system of FIG. 3.

Referring now to FIG. 4, the intake pipe 56 is shown connected to the bottom of the cooling section 26. A flared transition 62 interconnects the end of the pipe 56 with the bottom wall 64 of the cooling section 26. Air circulates from the transition section 62 through apertures 66 formed in the bottom wall 64 of the cooling section 26. Apertures 68 are formed in the dividing wall 72 between the cooling section 26 and the refrigerated food compartment 24 where the food is stored. These apertures enable the air to flow over the ice cubes, cool and then circulate to the refrigerated food compartment 24. It should be understood that additional apertures could be formed where desired to enable the cooled air to pass over the ice cubes and into the refrigerated food compartment. Additionally, cool air flows over the top of the cooling section 26 as shown by the arrows into the food compartment 24.

Figure 5:
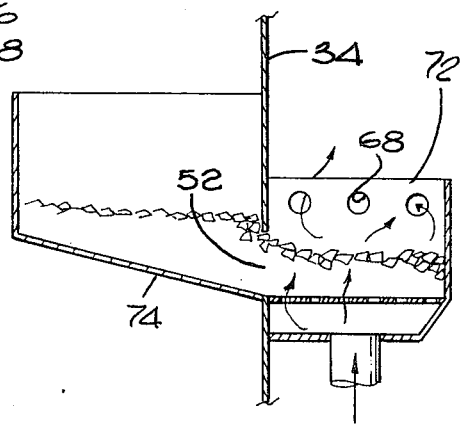
FIG. 5 is a side view of the refrigeration system taken along the line S S of FIG. 4.

FIG. 5 illustrates the transportation of the ice from the ice storage bin 38 into the cooling section 26. As can be readily seen, the bottom wall 74 of the ice storage bin 38 angles downwardly so that the ice can flow toward the aperture 52 interconnecting the ice storage bin 38 and the cooling section 26. At the aperture 52, the bottom wall 74 of the ice storage bin 38 is integral with the bottom edge of the aperture 52. Once the ice cubes fall into the cooling section 26, the circulating air is cooled as it passes over the cubes.

As the ice in the cooling section 26 melts, water passes through the aperture 66 in the bottom wall 64 and tends to accumulate in intake pipe 56. A drain pipe 76 (FIG. 3) coupled to the lower surface of the intake pipe 56 provides a removal path for this water to a storage bin 78 and thus enables air to circulate through intake pipe 56.

Normally, the ice storage bin 38 is enclosed by a cover (not shown) and insulation can be provided so as to minimize melting of the ice and heating of the circulating air. In addition, the pipes 54 and 56 can also be wrapped in insulation so as to keep the air flowing therein from being heated by the surrounding environment. The present invention provides a relatively simple, inexpensive and safe method of cooling food in a refrigerated catering truck. Costs are minimized as no compresser need be replaced and only a minimum of energy is used to drive the blower fan 44.

I claim:

1. In combination, a refrigeration system and a catering truck comprising:
    a reservoir for ice cubes;
    a food compartment for storing food under refrigeration having a cooling section adjacent thereto;
    means for gravity feeding ice from said reservoir to said cooling section through an aperture interconnection;
    a blower for directing air through an intake pipe to said cooling section and then circulating cooled air from said cooling section through said food compartment; and
    an exhaust pipe interconnecting said food compartment and said blower for recirculating air in said food compartment to said blower drain means for removing ice melt from the cooling section.

2. A refrigeration system for a catering truck in accordance with claim 1 wherein said reservoir bottom is angled enabling said ice cubes to move by gravity towards said aperture, the aperture bottom edge being aligned with said reservoir bottom wall.

3. A refrigeration system in accordance with claim 2 wherein said cooling section has a lower wall below said aperture enabling said ice cubes to fall from said aperture into said cooling section.

* * * * *